United States Patent [19]

Sell

[11] Patent Number: 5,957,148

[45] Date of Patent: Sep. 28, 1999

[54] VALVE SYSTEM HAVING A DEADMAN CONTROLLED ACTUATING MEMBER IN A VENTED CHAMBER

[75] Inventor: Edward A. Sell, West Chester, Pa.

[73] Assignee: General Transervice, Inc., Coatesville, Pa.

[21] Appl. No.: 08/989,310

[22] Filed: Dec. 12, 1997

[51] Int. Cl.⁶ .................................................. G05D 11/00
[52] U.S. Cl. ................................ 137/115.21; 137/115.23; 137/115.18; 137/489.5; 251/29; 251/26
[58] Field of Search .................................. 251/26, 28, 29; 137/495, 115.21, 115.23, 115.07, 489.5, 115.13, 115.18

[56] References Cited

U.S. PATENT DOCUMENTS

| | | | |
|---|---|---|---|
| 2,291,783 | 8/1942 | Baak | 251/29 |
| 3,089,512 | 5/1963 | Julien | 251/29 |
| 3,570,542 | 3/1971 | Otto | 251/29 |

*Primary Examiner*—Denise L. Ferensic
*Assistant Examiner*—Ramyar Farid
*Attorney, Agent, or Firm*—Ratner & Prestia

[57] ABSTRACT

A main valve receives fluid at an inlet and transmits the fluid to an outlet. The main valve has a rear face. A surge control servo valve responds to a load sense signal and moves between a closed position and an open position in which the fluid is transmitted from the inlet to the rear face of the main valve, to close the main valve. A deadman control mechanism responds to a pneumatic control signal and actuates the surge control servo to the closed position when the load sense signal is less than a threshold value. The deadman control mechanism includes: a pneumatically operated piston, separate and distinct from the surge control servo, and a member connected to the piston for engaging the surge control servo within an atmospherically vented chamber. Also, a bypass valve system comprises a main valve for receiving fluid at an inlet and transmitting the fluid to tank. A pressure control valve mechanism is coupled to receive a load sense signal for controlling the pressure of the fluid on the rear face of the main valve. A deadman control mechanism responds to a pneumatic control signal and actuates the pressure control valve mechanism to the closed position to close the main valve when the load sense signal is less than a threshold value. The deadman control mechanism includes: a pneumatically operated piston, separate and distinct from the pressure control valve mechanism, and a member connected to the piston for engaging the pressure control valve mechanism.

1 Claim, 7 Drawing Sheets

VALVE SYSTEM HAVING A DEADMAN CONTROLLED ACTUATING MEMBER IN A VENTED CHAMBER

FIELD OF THE INVENTION

The present invention relates to control valves generally, and more specifically to fuel control valves for aircraft refueling.

BACKGROUND OF THE INVENTION

Fuel control valve systems for supplying fuel to aircraft are well known. Typically, such valve systems include a surge control servo system for preventing any spike or high frequency change in the flow rate from the system pump or from quick tank closure being transmitted to the aircraft fuel intake. A manually operated deadman control switch is also used. The deadman switch only allows fuel delivery to the aircraft while an operator manually actuates the deadman switch. The above features of fuel control systems are used to prevent fuel spillage during a refueling operation.

FIG. 6 is a cross sectional view of a conventional flow control-surge control servo system 600, with the main flow control valve 110 closed. Valve system 600 includes three main components: the main flow control valve 110, the surge control servo 650, and the pressure control valve 170, all within a housing 102.

Main flow control valve 110 receives fluid at an inlet 116 and transmits the fluid to an outlet 124. Main flow control valve 110 has a poppet 112. Poppet 112 has a front face 112a and a rear face 112b, which faces a chamber 122. A main bias spring 118 engages rear face 112b and biases poppet 112 towards its seat 114. Poppet 112 transmits fluid to the outlet 124 when poppet 112 is open. When the pressure force on front face 112a is greater than the sum of the bias force of spring 118 and the fluid pressure force on rear face 112b, poppet 112 opens. When the pressure force on front face 112a is less than the sum of the bias force of spring 118 and the fluid pressure force on rear face 112b, poppet 112 closes. The outlet 659 of main flow control valve cavity 122 is closed by surge piston 654 from inlet pressure 126.

Housing 102 has a cylindrical bore 104 having an inner wall, in which surge control 650 is slidably mounted. Surge control 650 includes first and second pistons 648 and 654, respectively, and a connecting member 652 between pistons 648 and 654. A top chamber 657 is formed between the first and second pistons 648 and 654. Chamber 657 has a load sense port 644 for receiving fluid at a load sense pressure controlled by the load sense signal. The load sense pressure signal is also transmitted from chamber 657 to a load sense chamber 181 of pressure control 170, via a fluid path 668.

Surge control servo 650 has a biasing spring 651 positioned in chamber 657 between the first and second pistons 648 and 654. The bottom end of spring 651 is fixed in place against end of bore 104. The top end of spring 651 exerts a bias force on the bottom of first piston 648, in a direction tending to open outlet 659 to inlet pressure 126 to fill cavity 122 causing valve to close.

A load sense fluid pressure signal is provided at a load sense port 644. Surge control servo 650 moves between a closed position (not shown in FIG. 6), in which piston 654 blocks passage 126 and an open position (shown in FIG. 6). Under normal operating conditions, surge control servo 650 remains in the closed position. As long as the load sense pressure is below a predetermined threshold value, changes in load pressure are accommodated by the pressure control valve assembly 170, described below.

Piston 648 of servo valve 650 separates the load sense chamber 657 from a pressurized air chamber 634. Chamber 634 is formed by the inner wall of bore 104 and the top of piston 648. A manual deadman control switch 635 is held by the operator. To operate the flow control system 100, an operator manually activates a deadman control switch 635 to input pressurized air into cylinder 634. When the operator actuates switch 635, pressurized air is input to air chamber 634 via input port 632. The pressurized air in chamber 634 exerts a force on piston 648 to overcome the force of bias spring 651. As long as the air is applied, and the load sense pressure is below the acceptable threshold pressure, piston 654 of servo 650 remains in the closed position (not shown), blocking passage 126.

A pressure control valve 170 is also included within the housing 102. Pressure control valve 170 includes a piston 178 which is slidably mounted between two bias springs 180 and 182 within a bore 103 of housing 102. A pressure control poppet 174 is attached to piston 178 by a rod 184. Valve 170 has a chamber 183 connected to pressurized chamber 634 by a connecting passage 666, and is thus connected to the pressurized air supply. When the load sense pressure is below a setpoint pressure, poppet 174 is normally open (not shown in FIG. 6).

During normal operation, a gradual increase in the load sense pressure above the setpoint (but below a surge pressure threshold for opening the servo 650) is accommodated by the pressure control valve 170, without affecting the position of surge control servo 650. Normally, when the load sense pressure is below the surge pressure threshold, servo 650 is in the closed position (not shown in FIG. 6), with the bottom of piston 654 blocking flow between passage 126 and main valve outlet 659.

If the load sense pressure in chamber 657 increases above the surge pressure threshold, the sum of the pressure force on the bottom of piston 648 plus the force of spring 651 overcomes the pneumatic pressure force on piston 648. In this state, the surge control servo 650 opens, to the position shown in FIG. 6.

With surge control servo 650 in the open position, the fluid is transmitted rapidly, at a high flow rate, from the inlet 126 of surge control servo 650 to the main valve outlet 659, and into chamber 122. When surge control servo 650 is open, the pressure force on rear face 112b of the flow control valve 110 builds up quickly to close poppet 112, as shown in FIG. 6.

On the other hand, even if the load sense pressure is below the setpoint value, if the operator releases the deadman control switch, the pressurized air supply to chamber 634 is exhausted. With no pressure in chamber 634, the sum of the load sense pressure force on the bottom of piston 648 plus the force of spring 651 is effective to open the surge control servo 650, to the position shown in FIG. 6.

The control servo system 600 of the prior art leaves much to be desired. In the event of differential thermal expansion, fluid may leak from load sense chamber 657 into chamber 634. In that case, the fuel or fluid in chamber 657 mixes into the pressurized air in chamber 634, contaminating the pressurized air supply. Similarly, dirt or o-ring debris may pass from the sides of piston 648 into the pressurized air supply.

Another problem with the system 600 is that the pressurized air in pressure control valve chamber 183 is coupled to the pressurized air supply used by the deadman control 635. Thus, any variations in the pressure of the pressurized air pressure supply also affect the upward pressure exerted on piston 178 of the pressure control valve, and introduce instability into the pressure control. The pressure of the pressurized air supply may vary, and instability in the pressure control is introduced thereby. For example, the air supply pressure may be affected by temperature changes.

Because of these problems with the system as shown in FIG. 6, such systems have been supplanted by a system having an external deadman control loop (not shown). In the external deadman control system, pressurized air is not applied to the pressure control valve 170 or the surge control servo 650. Thus, the position of the surge control servo piston is independent of the deadman control.

The external deadman control system has an additional valve (not shown in FIG. 6) for rerouting fluid in response to the actuation or release of the deadman switch 635. An exemplary valve for performing this function is the "83" series ball valve manufactured by the Whitey Co. of Highland Heights, Ohio. (hereinafter referred to as the "Whitey" valve). In the external deadman system, additional fluid paths (not shown) connect passage 186 and 126 to the "Whitey" valve and connect cavity 176 to the "Whitey" valve. The "Whitey" valve allows fluid to flow from cavity 176 to passage 186 when the handheld deadman switch 625 is activated, and blocks the flow of fluid from passage 126 to cavity 176.

When deadman switch 625 is released, the "Whitey" valve stops the fluid that passes through poppet cavity 176 and passage 186 and returns that fluid with fluid from passage 126 into chamber 122, closing main valve 110. However, the flow rate of fluid through poppet 174 is much less than the flow rate through passage 659 would be if surge control servo is open. As a result, the closing time for the main valve 110 after release of the deadman switch 635 is much slower than the closing time for the main valve 110 after surge control servo 650 moves to the open position shown in FIG. 6. Furthers the external deadman control system for rerouting fluid in response to the actuation or release of the deadman switch 625 is very expensive and slow in closure. An improved servo control system is desired.

FIG. 7 is a cross sectional view of a bypass valve to be used in conjunction with the flow control valve system of FIG. 6. Whereas valve system 600 transmits fuel only when the deadman control 625 is actuated, bypass valve system 700 transmits fuel when the deadman control 625 is released.

The main valve 110 of bypass valve system 700 is similar to the main valve 110 of FIG. 6 described above, and common items in FIGS. 6 and 7 have the same reference numerals. Descriptions of the common components of the flow control valve 600 and the bypass valve 700 are not repeated herein.

Bypass valve system 700 includes a pressure control valve 770. A piston 778 is slidably mounted within a bore 703. Valve 770 has a poppet 772, connected to piston 778 by a rod 784. A biasing spring 782 biases piston 778 towards a closed position. A cylinder 781 between piston 778 arid seal 785 is maintained at the load sense pressure, by a load sense input port 776.

Passage 126 is directly coupled to chamber 122 of the main poppet, and to a chamber 751. When closed, poppet valve 772 separates chamber 751 from a passage 775 that is directly connected to the outlet 124 of main valve 110. When open, poppet valve 772 allows fluid to flow from passage 126 and chamber 751 to passage 775 and outlet 124. Thus, when poppet 772 is closed (not shown in FIG. 7), main poppet 112 is closed (not shown in FIG. 7). When poppet 772 is open (shown in FIG. 7), main poppet 112 is open.

When the load sense pressure exceeds the pressure threshold, pressure in chamber 781 is sufficient so that the sum of the pressure force on piston 778 is sufficient to overcome the bias force of spring 782, opening poppet 772. This in turn releases pressure from chamber 122 so that main valve 112 opens. As a result, the flow from pump 40 is routed through the bypass valve (At the same time, the main valve of flow control system 600 closes, as described above.)

When the manually operated deadman switch 625 is released, the external "Whitey" valve 626 allows fluid in passage 126 to enter passage 752, and flow through passages 786 and 790 to the outlet of bypass valve system 700. This releases pressure from chamber 122, so that the fluid pressure on the front face 112a of main poppet 112 is sufficient to overcome the bias force of spring 118, opening the main valve as shown in FIG. 7.

A pump relief regulator 550 is connected across bypass valve 700, by passages 784 and 788. If the inlet pressure is unacceptably high, regulator 550 allows the fluid to bypass main valve 110 and flow to tank, regardless of whether the deadman control 625 is actuated.

When the operator actuates the deadman switch 625 (position not shown in FIG. 7), "Whitey" valve 626 blocks fluid flow through passage 786; the bypass valve system 700 is normally in the closed state (not shown in FIG. 7). Fluid from the inlet flows from passage 126 into chamber 122 and applies pressure to close piston 112. The fluid flows through flow control valve system 600 (FIG. 6); none of the fluid from the system pump 40 passes through bypass valve system 700 (FIG. 6).

The bypass valve system 700 depends on the flow through passage 786 to release fluid from chamber 122 in order to open the main valve 110. The requirement of the "Whitey" valve is very expensive.

An improved servo control system is desired.

SUMMARY OF THE INVENTION

The present invention is a flow control valve system. A main valve mechanism receives fluid at an inlet and transmits the fluid to an outlet. The main valve mechanism has a rear face.

A surge control mechanism responds to a load sense signal and moves between a closed position and an open position in which the fluid is transmitted from the inlet to the rear face of the main valve mechanism, in order to close the main valve mechanism.

A deadman control mechanism responds to a pneumatic control signal and actuates the surge control mechanism to the closed position when the load sense signal is less than a threshold value. The deadman control mechanism includes: a pneumatically operated piston, separate and distinct from the surge control mechanism, and a member coupled to the piston for engaging the surge control mechanism within an atmospherically vented chamber.

According to another aspect of the present invention, a bypass valve system comprises a main valve mechanism for receiving fluid at an inlet and transmitting the fluid to tank. The main valve mechanism has a rear face.

A pressure control valve mechanism is coupled to receive a load sense signal for controlling the pressure of the fluid on the rear face of the main valve mechanism.

A deadman control mechanism responds to a pneumatic control signal and actuates the pressure control valve mechanism to the closed position to close the main valve mechanism when the load sense signal is less than a threshold value. The deadman control mechanism includes: a pneumatically operated piston, separate and distinct from the pressure control valve mechanism, and a member coupled to the piston for engaging the pressure control valve mechanism.

DETAILED DESCRIPTION

FLOW CONTROL VALVE SYSTEM

Figure 1:
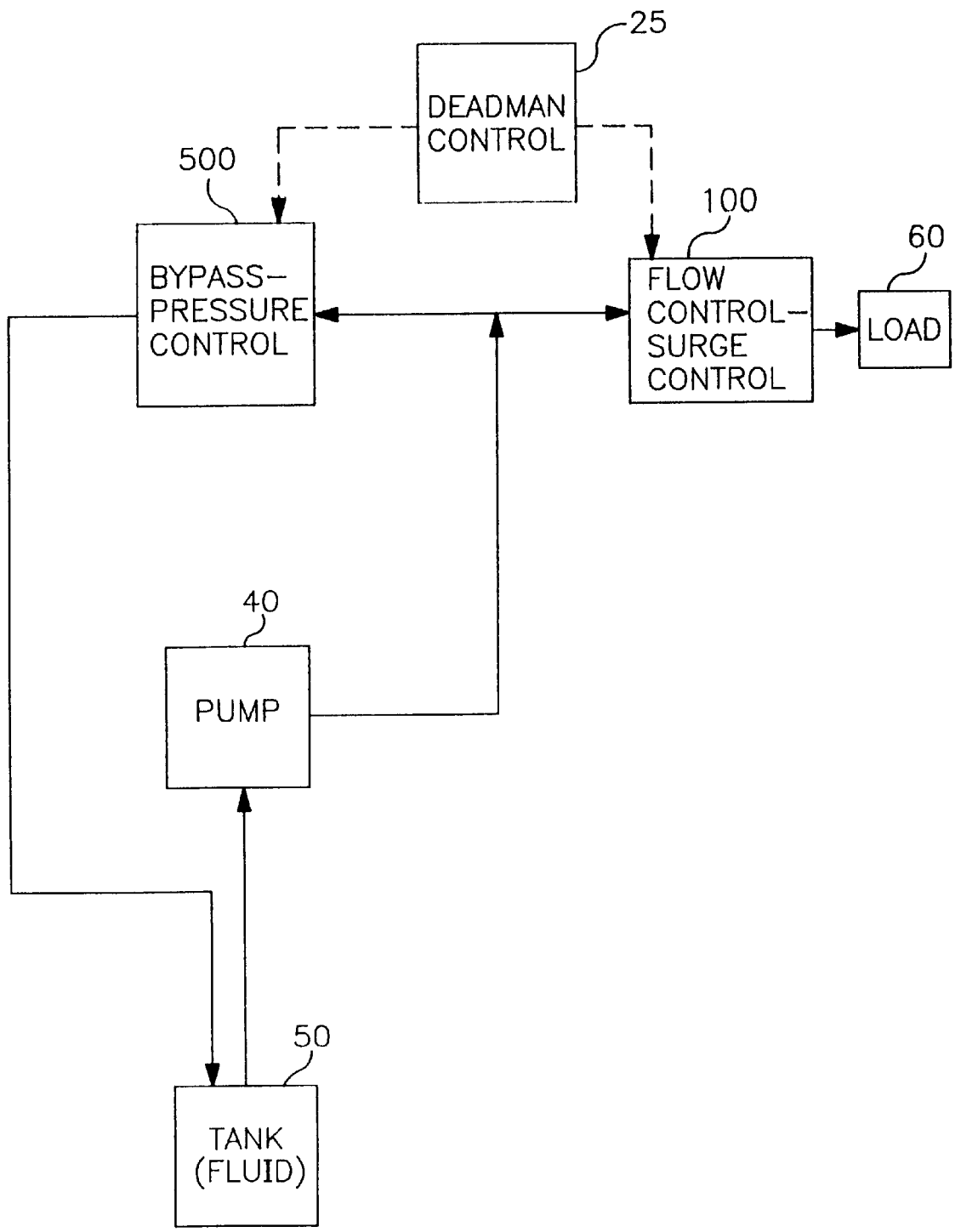
FIG. 1 is a block diagram of an exemplary fuel delivery system according to the invention.

FIG. 1 is a block diagram of an exemplary fuel delivery system according to the invention. The exemplary system may, for example, be used for providing fuel to an aircraft. The fluid, which may be fuel, is pumped out of a reservoir or tank 50 by a pump 40. Pump 40 may be a conventional constant-displacement pump.

In the exemplary system the pump 40 is always operating and furnishing pressure and flow. A bypass valve system 500 provides a path to tank 50 for the fluid. The flow control valve system 100 provides a path to the load 60, which may be a fuel delivery port of an airplane. Both the bypass valve system 500 and the flow control valve system are responsive to a deadman control 25. Deadman control 25 is a manually actuated device. When the operator of the fuel delivery system actuates deadman control 25, bypass valve system 500 is normally closed, and flow control valve system is normally open, so that the fluid is delivered to the load 60. When the operator releases deadman control 25, bypass valve system 500 is normally open, and flow control valve system is normally closed, so that the fluid is delivered to tank 50.

Figure 2:
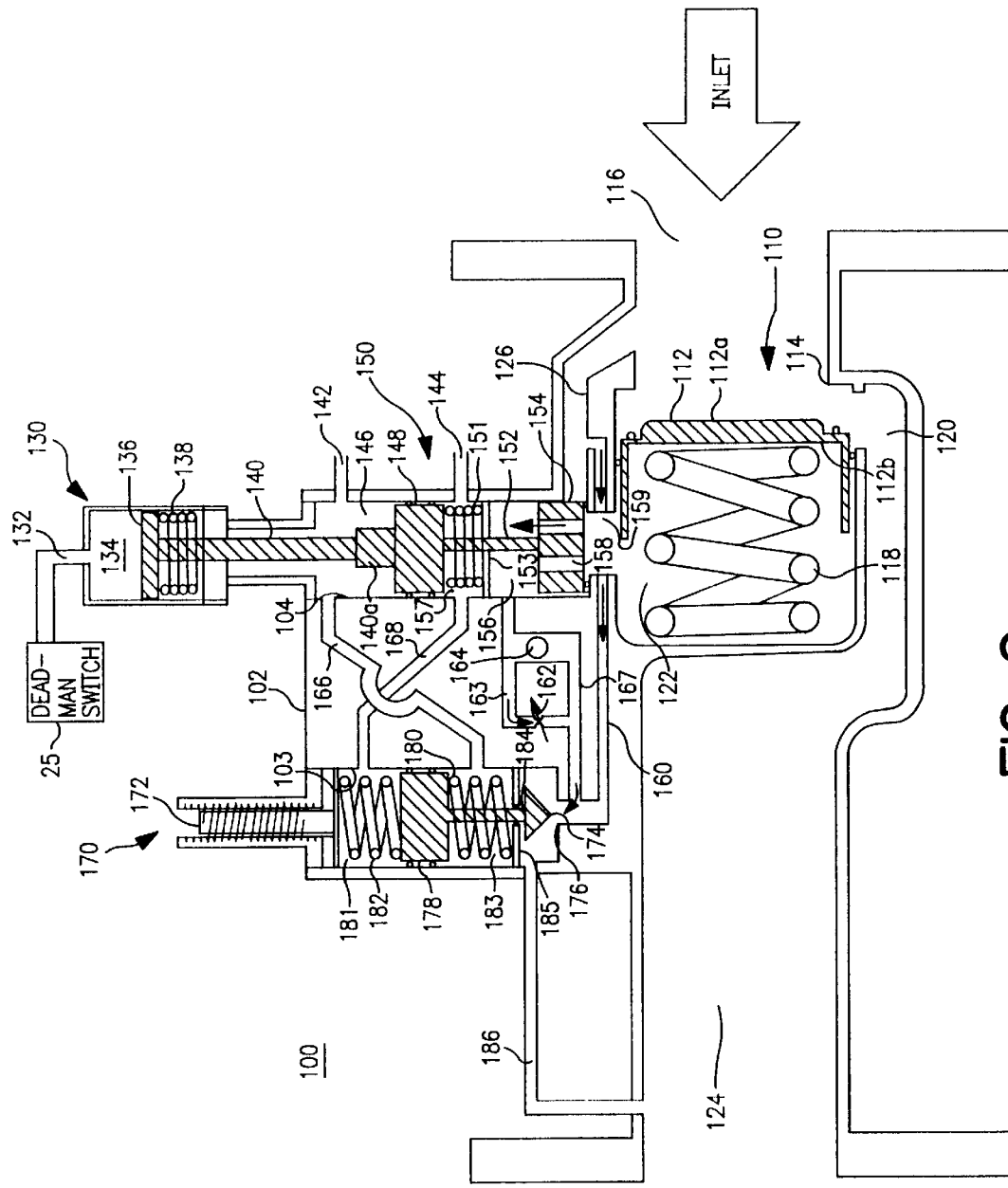
FIG. 2 is a cross sectional view of the flow control—surge control servo system shown in FIG. 1, with the deadman control actuated, and the main flow control valve open.

FIG. 2 is a cross sectional view of the flow control—surge control servo system 100 shown in FIG. 1, with the deadman control actuated, and the main flow control valve open. Valve system 100 includes four main components: the main flow control valve 110, the surge control servo 150, the deadman control actuator 130, and the pressure control valve 170, all within a housing 102.

Main flow control valve 110 receives fluid at an inlet 116 and transmits the fluid to an outlet 124. Main flow control valve 110 has a poppet 112 and a seat 114. Poppet 112 has a front face 112a which is fluidly coupled to inlet 116, and a rear face 112b, which faces a chamber 122. A main bias spring 118 engages rear face 112b and biases poppet 112 towards its seat 114. Poppet 112 has an outlet 120 which transmits fluid to the outlet 124 of valve system 100 when poppet 112 is open. When the pressure force on front face 112a is greater than the sum of the bias force of spring 118 and the fluid pressure force on rear face 112b, poppet 112 opens. When the pressure force on front face 112a is less than the sun of the bias force of spring 118 and the fluid pressure force on rear face 112b , poppet 112 closes. The outlet 159 of the surge control servo 150 opens into chamber 122 of poppet 112.

Housing 102 has a cylindrical bore 104 having an inner wall, in which surge control servo 150 is slidably mounted. Surge control servo 150 includes first and second pistons 148 and 154, respectively, and a connecting member 152 between pistons 148 and 154. A top chamber 157 is formed between the first and second pistons 148 and 154. Chamber 157 is sealed non-hermetically. Chamber 157 has a load sense port 144 for receiving fluid at a load sense pressure controlled by the load sense signal. The load sense pressure signal is also transmitted from chamber 157 to a load sense chamber 181 of pressure control valve 170, via a fluid path 168.

Surge control servo 150 has a biasing spring 151 positioned in chamber 157 between the first and second pistons 148 and 154. The bottom end of spring 151 is fixed in place by a retaining ring 153. The top end of spring 151 exerts a bias force on the bottom of first piston 148, in a direction tending to open surge control servo 150.

A bottom chamber 156 is formed between retaining ring 153 and bottom piston 154. Bottom piston 154 includes a plurality of passages 158 connecting chamber 156 and surge control servo outlet 159. Passages 158 may be grooves or cylindrical holes.

Surge control servo 150 is responsive to a load sense fluid pressure signal provided by a load sense port 144. Surge control servo 150 is movable between a closed position (shown in FIG. 2) and an open position (shown in FIG. 4). Under normal operating conditions, surge control servo 150 remains in the closed position (shown in FIG. 2). So long as the load sense pressure is below a predetermined threshold value, changes in load pressure are accommodated by the pressure control valve assembly 170, described below. In the exemplary embodiment, the threshold pressure for opening surge control servo 150 (hereinafter referred to as the "surge pressure threshold") may be set to 64 pounds per square inch (psi), or approximately 441,280 Newtons/square meter ($N/m^2$).

According to an aspect of the invention, the flow control assembly 100 includes an "internal" deadman control mechanism 130. The "internal" deadman control does not require any external fluid loop in which the fluid is conveyed outside of the valve assembly 100 for operation of the deadman control. Deadman control mechanism 130 includes a pneumatically operated piston 136 within a pneumatic cylinder 134. A rod or member 140 is connected to pneumatically operated piston 136 for engaging piston 148 of surge control servo 150. According to the invention, member 140 engages piston 148 within an atmospherically vented chamber 146. Rod 140 may have a flexible tip 140a (formed of a rubber or polymer material), to prevent damage to rod 140 or piston 148 when rod 140 engages piston 148.

Unlike prior art systems, the invention allows complete separation between the fluid in chamber 157 and the air in cylinder 134, even with an internal pneumatically controlled deadman. In the event that differential expansion between piston 148 and bore 104 results in leakage from load sense chamber 156 into chamber 146, the fuel or fluid, or vapor therefrom, exits through a port 142 harmlessly, without mixing into the pressurized air in cylinder 134.

Deadman control 130 is responsive to a pneumatic control signal input via a pneumatic input port 132 from the operator's manually held deadman switch 25. To operate the flow control system 100, an operator manually activates a deadman control switch 25 to input pressurized air into cylinder 134 of deadman control 130. Piston 136 pushes down on member 140, which in turn exerts a force on piston 148. Thus, the pressurized air in cylinder 134 exerts a force on the deadman piston 136 to overcome the bias force of bias spring 138 and the bias force of spring 151. As long as the pneumatic control signal is applied, and the load sense pressure is below the acceptable threshold pressure, piston 154 of servo 150 remains in the closed position, as shown in FIG. 2.

Figure 6:
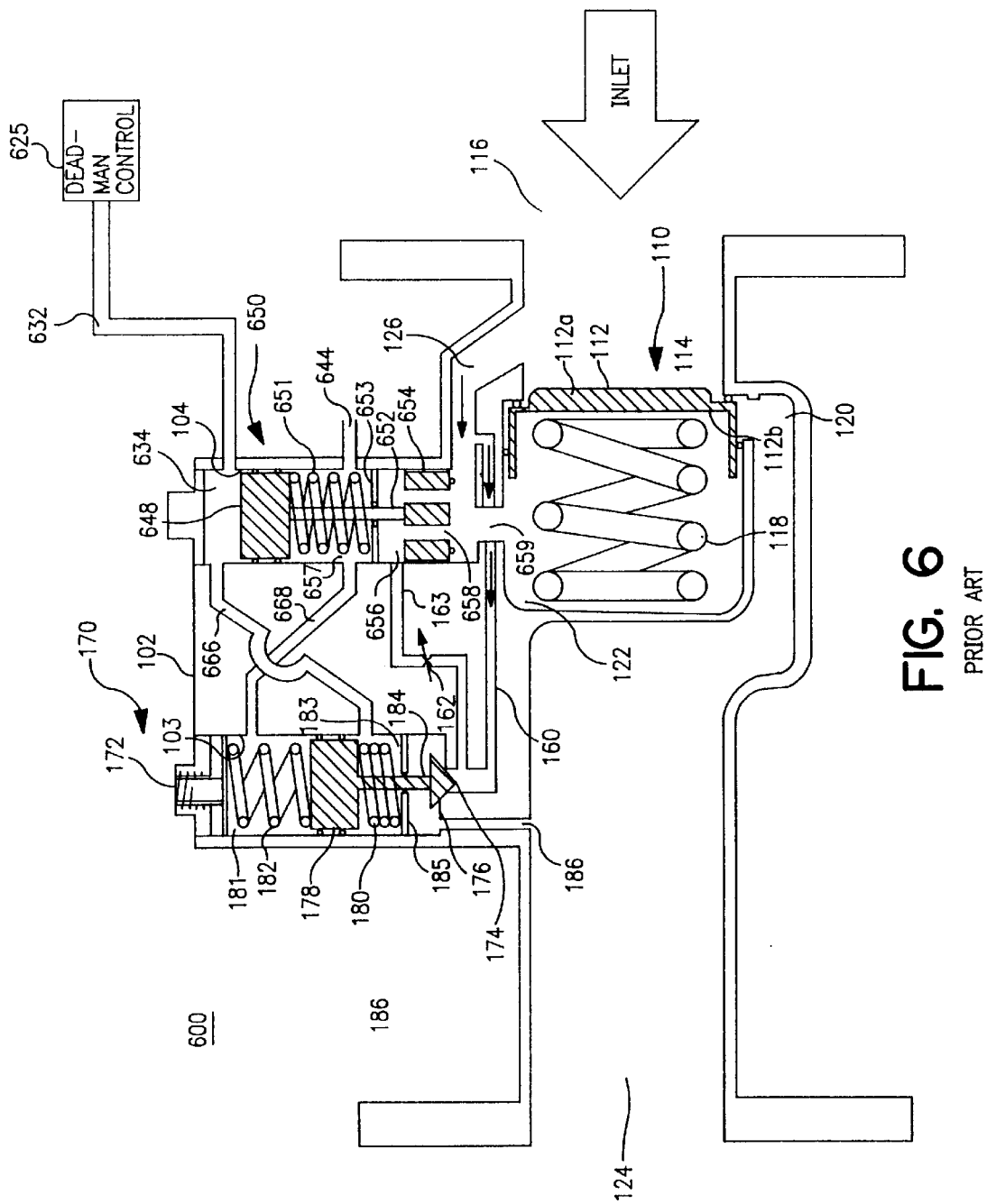
FIG. 6 is a cross sectional view of a prior art flow control—surge control servo system.
Figure 7:
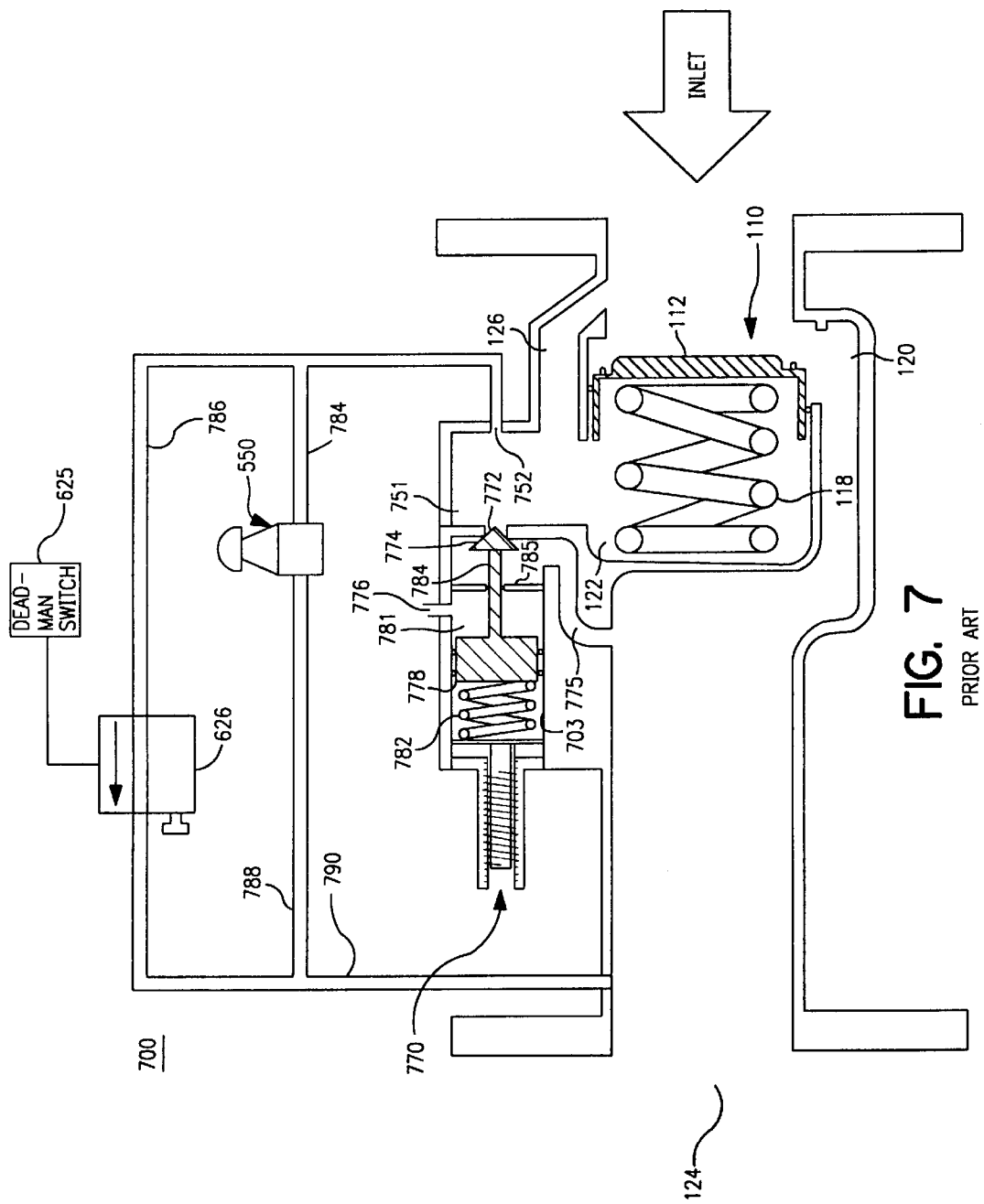
FIG. 7 is a cross sectional view of a prior art bypass valve.

A pressure control valve 170 is also included within the housing 102. Pressure control valve 170 has a conventional design, similar to that of the valve 170 shown in FIG. 6, and described above.

Pressure control valve 170 includes a piston 178 which is slidably mounted between two bias springs 180 and 182 within a bore 103 of housing 102. A pressure control poppet 174 is attached to piston 178 by a rod 184. Bore 103 is divided into three portions. The topmost portion 181 above piston 178 is a chamber connected to load sense chamber 157 by a connecting passage 168. Thus chamber 181 is maintained at the load pressure. A second portion is a chamber 183 is bounded on top by piston 178, and on the bottom by a retaining ring 185. Chamber 183 is connected to vented chamber 146 by a connecting passage 166, and is thus vented to the atmosphere.

The third portion of bore 103 contains pressure control poppet 174. Pressure control valve 170 is configured so that poppet 174 is open when the load sense pressure is below a setpoint value, and closed when the load sense pressure is greater than the setpoint value. In the exemplary embodiment, the setpoint value is 45 psi, or about 310,275 N/m². Poppet 174 is adjustable by turning threaded shaft 172 to increase or decrease the bias force of spring 182. Poppet 174 opens when the sum of the bias force from spring 180 plus the pressure force applied by the fluid under poppet 174 is greater than the sum of the bias force of spring 182 plus the pressure force of the load sense pressure acting on the top area of piston 178.

When the load sense pressure is below surge threshold pressure (e. g., below 64 psi), and fluid pressure is applied to the inlet 116, the fluid is transmitted from inlet 116, through passage 126 and passage 160, and out through the opening 176 of poppet 174. This path is shown by the directional arrows in FIG. 2.

Additionally, conventional joints, fittings, seals, o-rings, fasteners and the like are included, as would be readily understood by one of ordinary skill in the art. A description of these items is not included herein.

Figure 3:
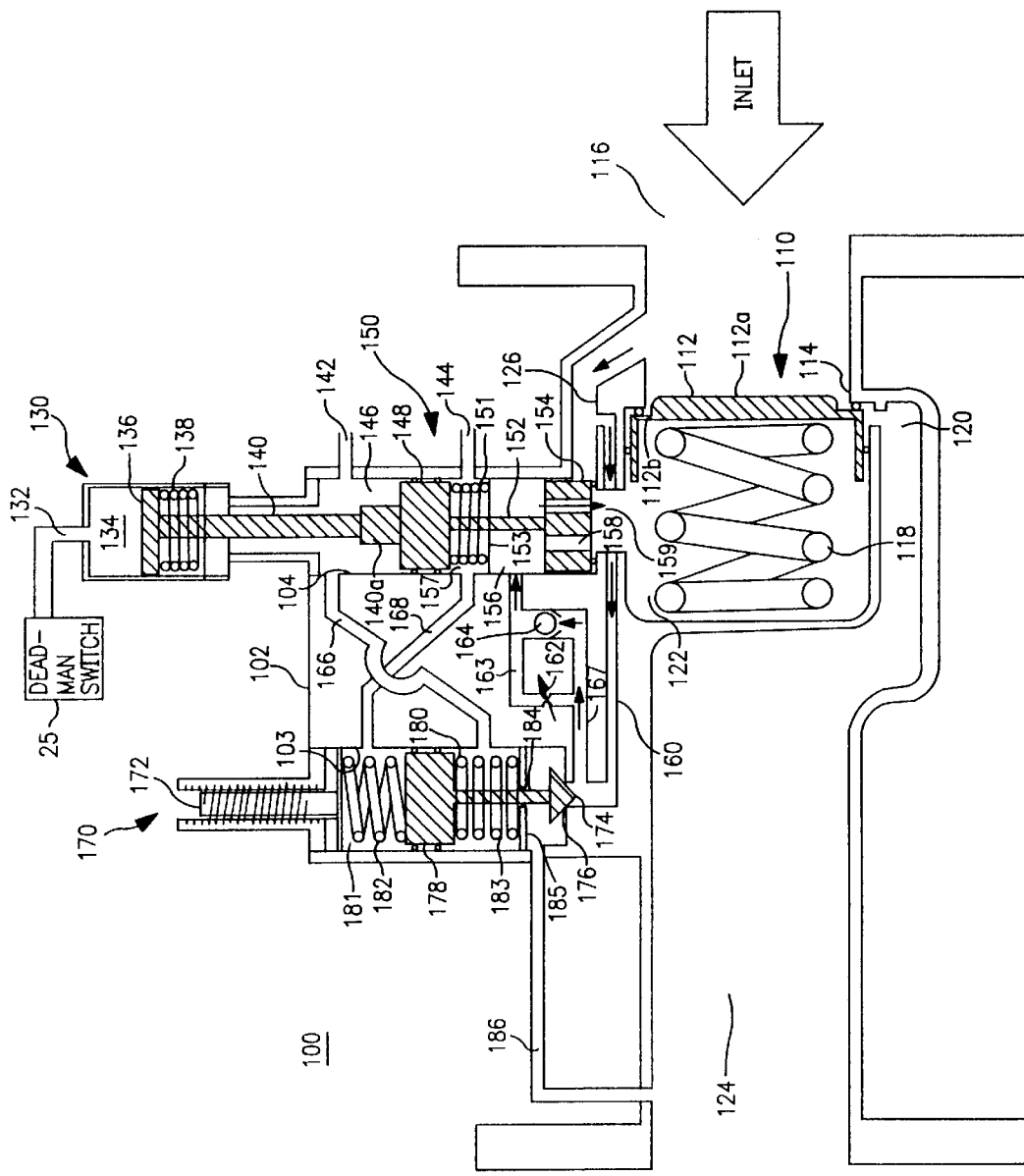
FIG. 3 is a cross sectional view of the flow control—surge control servo system shown in FIG. 1, with the deadman control actuated, and the main flow control valve closed.

FIG. 3 shows valve system 100 with surge control servo 150 in the closed position and the main poppet 112 closed. During normal operation, a gradual increase in the load sense pressure above the setpoint (but below the surge pressure threshold) is accommodated by the pressure control valve 170, without affecting the position of surge control servo 150. For example, in the exemplary embodiment, pressure control valve 170 controls the flow so long as the load sense pressure is below the surge threshold pressure of 64 psi, or 441 N/m². When the load sense pressure exceeds the setpoint value (e. g., 45 psi, or about 310,275 N/M²), the sum of the load sense pressure in chamber 181 plus the spring force of spring 182 overcomes the force of spring 180 and the pressure on poppet 174. As a result, piston 178 moves downward, closing poppet 174 as shown in FIG. 3.

When poppet 174 closes, the path of the fluid changes. Fluid from inlet 116 passes through passage 126, passage 160, check valve 164, passage 163, chamber 156, passages 158, and into chamber 122. The fluid increases the pressure in chamber 122, acting on rear face 112b of main poppet 112. The pressure balance on poppet 112 changes. When the sum of the pressure on rear surface 112b plus the force of spring 118 exceeds the pressure on face 112a, main valve 110 closes, as shown in FIG. 3.

Under ordinary conditions, when main valve 110 closes, the load pressure is relieved, so that the load sense pressure in chambers 157 and 181 returns to the setpoint value or less. When the load sense pressure in chamber 181 falls below the setpoint value (e.g., 45 psi, or about 310,275 N/m²), the sum of the force of spring 180 plus the pressure force under poppet 174 overcomes the sum of the load sense pressure on the top of piston 178 plus the force of spring 182. As a result, poppet 174 re-opens, to the position shown in FIG. 2. Fluid from chamber 122 now is released by way of the following route: the fluid leaves chamber 122 through passages 158, through chamber 156, through passage 163, through variable needle valve 162, passage 167, and out through poppet 174.

The fluid path for opening the main valve 110 is not the reverse of the path when closing the main valve 110. When opening main valve 10, ball check valve 164 is closed, so that fluid passes through needle valve 162. Needle valve 162may be adjusted to control the opening time for main valve 110, thus controlling the speed of the system response. On the other hand, when main valve 110 is being closed, check valve 164 is open, so that fluid can flow more rapidly to chamber 122, to close main valve 112 at a more rapid rate than during opening. The more rapid closing time (even in normal operation) prevents any undesirable results from occurring when the load sense pressure is above the setpoint.

Figure 4:
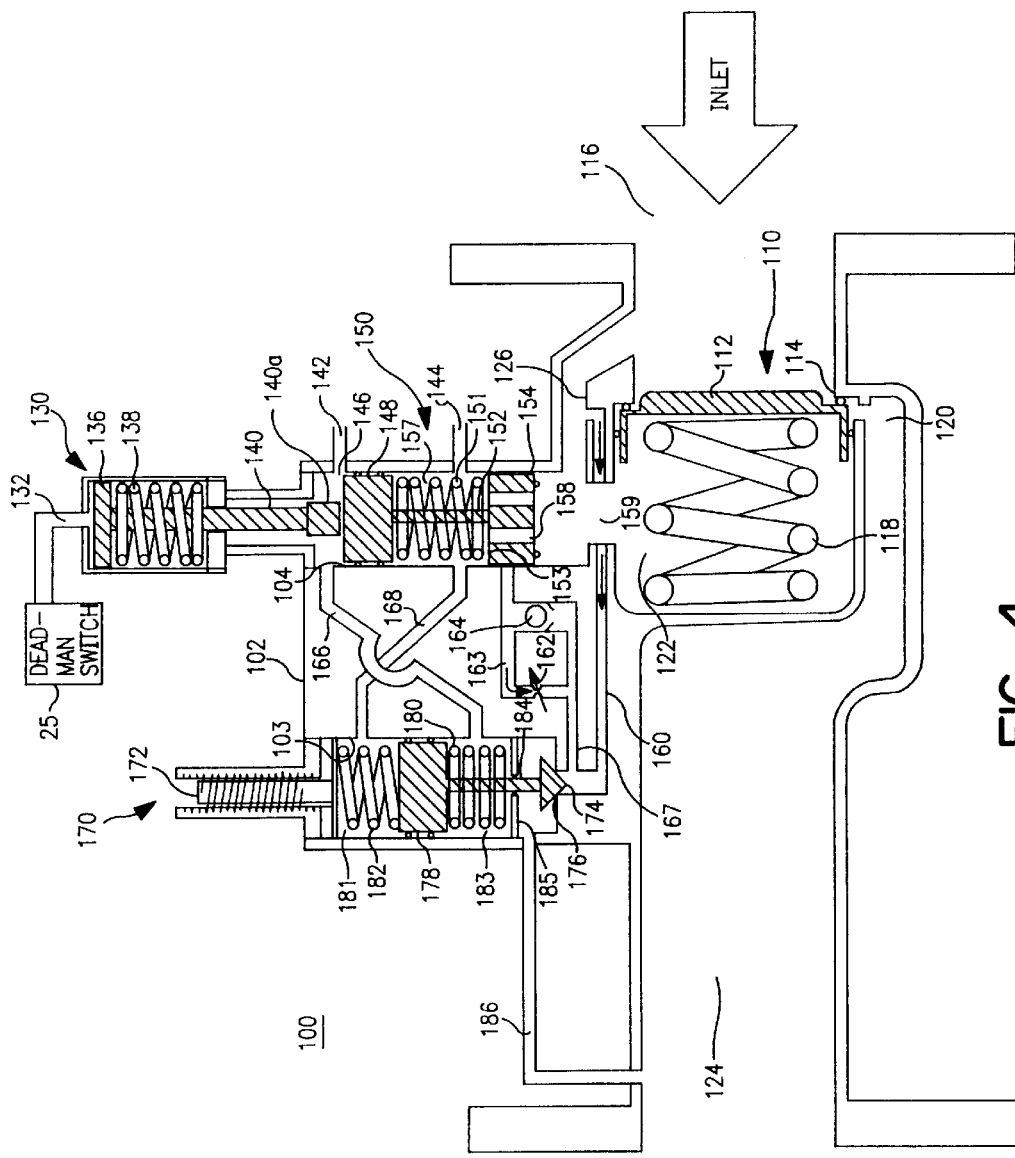
FIG. 4 is a cross sectional view of the flow control—surge control servo system shown in FIG. 1, with the deadman control released, and the main flow control valve closed.

FIG. 4 shows valve system 100 with surge control servo 150 in the open position and the main poppet 112 closed. If the load sense pressure increases above the surge pressure threshold, the sum of the pressure force on the bottom of piston 148 plus the force of spring 151 overcomes the force applied by rod 140 (The rod force is essentially the difference between the pneumatic pressure force on piston 136 and the spring force from spring 138). That is, the sum of the pressure force on the bottom of piston 148 plus the force of spring 151 plus the force of spring 138 is greater than the pneumatic force on piston 136. In this state, the surge control servo 150 opens, to the position shown in FIG. 4.

With surge control servo 150 in the open position, the fluid is transmitted rapidly, at a high flow rate, from the inlet 126 of surge control servo 150 to the outlet 159 of servo 150, and into chamber 122. When surge control servo 150 is open, the pressure force on rear face 112a of the flow control valve 110 builds up quickly to close poppet 112.

According to another aspect of the invention, the closing of the main valve 110 is achieved in the same rapid fashion, regardless of whether the deadman switch 25 is released or the load sense pressure rises above the surge pressure threshold. If the valve system is in the position shown in FIG. 2, and the deadman switch 25 is released, the air pressure in cylinder 134 decreases. When the pneumatic pressure force on piston 136 falls below the sum of the pressure force on the bottom of piston 148 plus the force of spring 151 plus the force of spring 138, surge control servo 150 opens, to the position shown in FIG. 4. As described above, once servo 150 opens, pressure rapidly builds up in chamber 122, to close main valve 110.

Thus, the springs 151 actuate the surge control servo 150 to the open position when either: (1) the load sense signal exceeds the surge pressure threshold value, or (2) the pneumatic control signal is not applied to the first deadman control cylinder 134 of deadman control mechanism 130.

The exemplary system according to the invention has multiple advantages. For example, by providing a vented chamber 146 between the pneumatically operated piston 136 and the top servo piston 148, the chance of introducing fuel or other fluid into the pressurized air supply is eliminated.

Further, chamber 183 of pressure control piston is vented to the atmosphere via passage 166 and chamber 146. The pressure in chamber 183 is substantially unaffected by such factors as variations in the supply pressure, or variations in the temperature in the valve system 100. Thus, there is less chance that any undesirable fluctuations in fluid pressure are introduced.

Still further, when compared to prior art systems using an external deadman control system, the present invention provides a much faster main valve closing time when the deadman control is released. An exemplary valve as described above closes within a period of time in which about 3.5 to 4% of the flow rate in gallons per minute (i.e., about 0.875 to 1% of the flow rate in liters per minute) flows through the system. For example, at a flow rate of 3200 liters per minute, about 144 liters flow into the main valve before it closes. This is about half the time in which a prior art flow control system having an external deadman control closes.

Another advantage of system 100 is the ability to vary the surge control characteristics by either changing the pneumatic pressure applied to cylinder 134. Alternatively, the diameter of cylinder 134 may be varied to achieve desired surge control characteristics.

BYPASS VALVE SYSTEM

Figure 5:
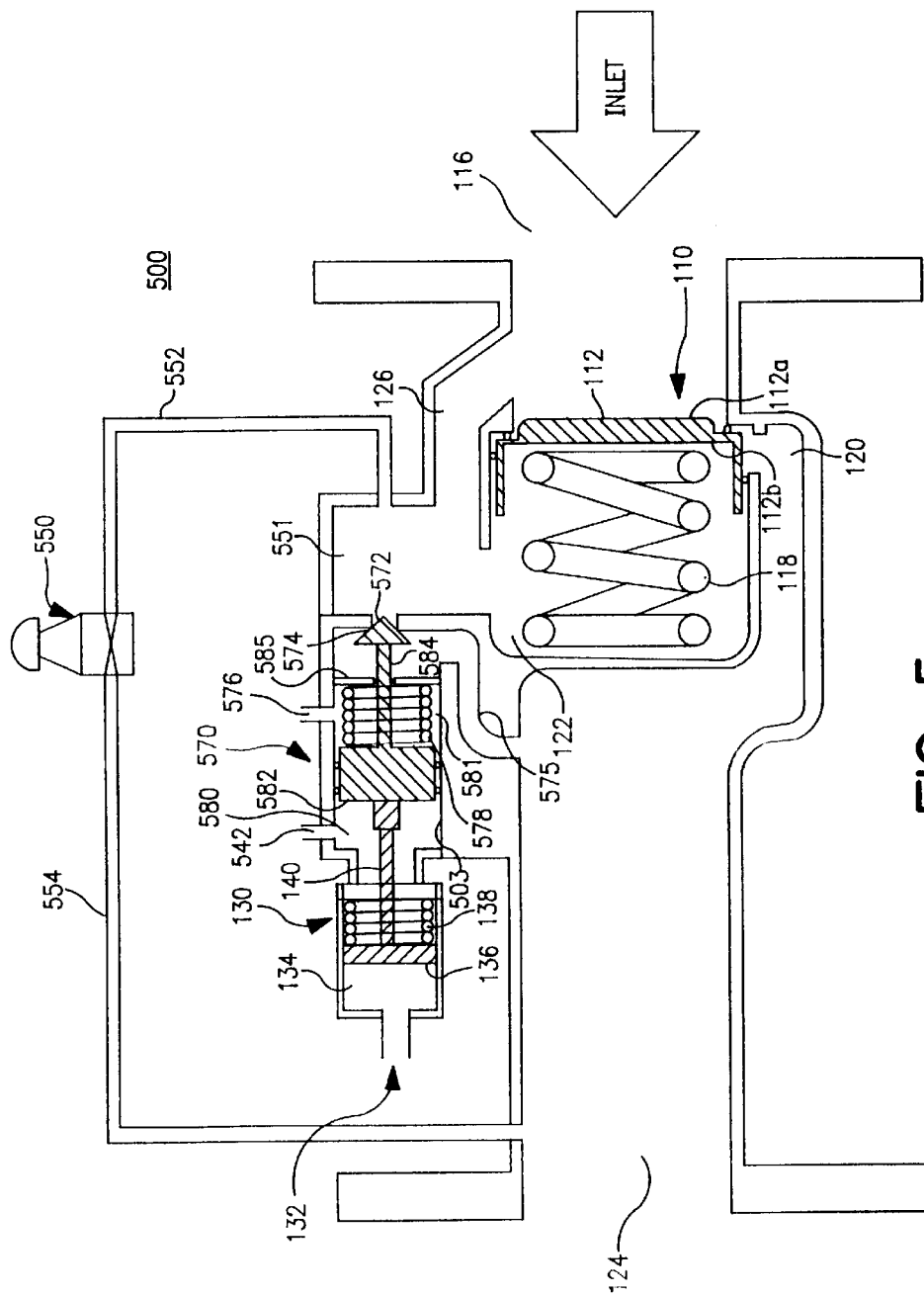
FIG. 5 is a cross sectional view of the bypass valve shown in FIG. 1.

FIG. 5 is a cross sectional view of the bypass valve shown in FIG. 1. Bypass valve system 500 complements valve system 100. Whereas valve system 100 transmits fuel only when the deadman control 25 is actuated, bypass valve system 500 transmits fuel when the deadman control 25 is released.

The main valve 110 of bypass valve system 500 is similar to the main valve 110 of FIGS. 2–4 described above, and common items in FIGS. 2–5 have the same reference numerals. Descriptions of the common components of the flow control valve 100 and the bypass valve 500 are not repeated herein.

Bypass valve system 500 includes a pressure control valve 570. A piston 582 is slidably mounted within a bore 503. Valve 570 has a poppet 572, connected to piston 582 by a rod 584. Poppet 572 has a seat 574. A biasing spring 578 and retaining ring 585 bias piston 582 towards an open position, in which poppet 572 is out of its seat. A cylinder between piston 582 and retaining ring 585 is maintained at the load sense pressure, by a load sense input port 576.

Passage 126 is directly coupled to chamber 122 of the main poppet, and to a chamber 551. When closed, poppet valve 572 separates chamber 551 from a passage 575 that is directly connected to the outlet 124 of main valve 110. When open, poppet valve 572 allows fluid to flow from passage 126 and chamber 551 to passage 575 and outlet 124. Thus, when poppet 572 is closed (as shown in FIG. 5), main poppet 112 is closed (as shown in FIG. 5). When poppet 572 is open (not shown), main poppet 112 is open (not shown).

When the load sense pressure exceeds the surge pressure threshold value, pressure in chamber 581 is sufficient so that the sum of the pressure force on piston 582 plus the bias spring forces of spring 578 and 138 is sufficient to overcome the pneumatic pressure force on piston 136, opening poppet 572. This in turn releases pressure from chamber 122 so that main valve 112 opens. As a result, the flow from pump 40 is routed through the bypass valve (At the same time, the main valve of flow control system 100 closes, as described above.)

A deadman control mechanism 130 similar to that shown in FIG. 2 is provided. The deadman control mechanism is responsive to the pneumatic control signal provided by the manually actuated deadman switch 25 for actuating the pressure control valve means to the closed position (shown in FIG. 5) to close the main bypass valve means when the load sense signal is less than the surge pressure threshold value.

The deadman control mechanism includes: a pneumatically operated piston 136, which is separate and distinct from the pressure control valve 570, and a member or rod 584 connected to the pneumatically operated piston 136 for engaging the pressure control valve means 570. Rod 140 engages piston 582 in a vented cylinder 580 formed by the inner wall of bore 503. A port 542 of cylinder 580 is open to the atmosphere. As in the flow control valve system 100 of FIGS. 2–4, the use of a sealed cylinder 134 that is separated from the piston 582 ensures that there is no mixing of the fluid into the pressurized air supply. Thus, bypass valve system 500 has a similar advantage of preventing contamination of the pressurized air.

A pump relief regulator 550 is connected across bypass valve 110, by passages 552 and 554. If the inlet pressure is unacceptably high, regulator 550 allows the fluid to bypass valve 110 and flow to tank, regardless of whether the deadman control 25 is actuated.

When the operator actuates the deadman switch 25, the bypass valve system 500 is normally in the state shown in FIG. 5. No fluid flows through bypass valve system 500; all of the fluid from the system pump 40 is directed to the flow control valve system 100 (FIGS. 2–4).

If the operator releases deadman switch 25, the sum of the load sense pressure in cylinder 581 and the spring forces of springs 578 and 138 is sufficient to overcome the pneumatic pressure force on piston 136. Poppet 572 moves to its open position (not shown in FIG. 5), allowing fluid to flow rapidly from chamber 122 out through passage 575 to outlet 124. The release of fluid from chamber 122 reduces the pressure force on the rear face 112b of poppet 112. When the pressure force on front face 112a exceeds the sum of the pressure force on rear face 112b plus the spring force of spring 118, main poppet 112 opens, allowing the fluid to flow from inlet 116 to outlet 124.

The exemplary bypass valve system 500 allows rapid opening of the main poppet 112 when deadman control 25 is released. This complements the rapid closing of the main valve of flow control—surge control system 100 when deadman control 25 is released. Thus, the exemplary system provides rapid closing of the flow to the load and opening of the bypass valve to tank at the same time, in response to release of the deadman switch 25. Both the closing of the main valve 110 in flow control system 100 and the opening of the main valve 110 in the bypass valve system 500 in response to the release of the deadman switch 25 occur at the same rapid rate as when a pressure surge opens the surge control servo 150 of flow control system 100.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A flow control system, comprising:

flow control valve means for receiving fluid at an inlet and transmitting the fluid to an outlet, the flow control valve means having a rear face;

surge control means responsive to a load sense signal and movable between a closed position and an open position in which the fluid is transmitted from the inlet to the rear face of the flow control valve means to close the flow control valve means;

first deadman control means responsive to a pneumatic control signal for actuating the surge control means to the closed position when the load sense signal is less than a first threshold value, the first deadman control means including:
- a first pneumatically operated piston, separate and distinct from the surge control means, and
- means coupled to the first pneumatically operated piston for engaging the surge control means within an atmospherically vented chamber;

bypass valve means for receiving fluid at the inlet and transmitting the fluid to tank, the bypass valve means having a rear face;

pressure control valve means coupled to receive the load sense signal for controlling the pressure of the fluid on the rear face of the bypass valve means, second deadman control means responsive to the pneumatic control signal for actuating the pressure control valve means to the closed position to close the bypass valve means when the load sense signal is less than a second threshold value, the second deadman control means including:
- a second pneumatically operated piston, separate and distinct from the pressure control valve means, and
- means coupled to the second pneumatically operated piston for engaging the pressure control valve means.

* * * * *

UNITED STATES PATENT AND TRADE MARK OFFICE
CERTIFICATE OF CORRECTION

PATENT NO. : 5,957,148
DATED : September 28, 1999
INVENTOR(S) : Edward A. Sell

It is certified that error appears in the above-identified patent and that said Letters Patent is hereby corrected as shown below:

Column 2, line 4, delete "635" and insert --625--.

Column 2, line 6, delete "635" and insert --625--.

Column 2, line 8, delete "635" and insert --625--.

Column 2, line 64, delete "635" and insert --625--.

Column 3, line 14, delete "635" and insert --625--.

Column 3, line 32, delete "635" and insert --625--.

Column 3, line 35, delete "Furthers" and insert --Further,--.

UNITED STATES PATENT AND TRADEMARK OFFICE
CERTIFICATE OF CORRECTION

PATENT NO. : 5,957,148
DATED : September 28, 1999
INVENTOR(S) : Edward A. Sell

It is certified that error appears in the above-identified patent and that said Letters Patent is hereby corrected as shown below:

Column 6, line 3, delete "sun" and insert --sum--.

Column 6, line 4, delete "112b ," and insert --112b,--.

Column 8, line 27, delete "162may" and insert --162 may--.

Signed and Sealed this

Twenty-seventh Day of June, 2000

Attest:

Q. TODD DICKINSON

Attesting Officer

Director of Patents and Trademarks